United States Patent
Roberge (10) Patent No.: US 11,174,798 B2
(45) Date of Patent: Nov. 16, 2021

(54) MISSION ADAPTIVE CLEARANCE CONTROL SYSTEM AND METHOD OF OPERATION

(71) Applicant: United Technologies Corporation, Farmington, CT (US)

(72) Inventor: Gary D. Roberge, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 65 days.

(21) Appl. No.: 16/359,010

(22) Filed: Mar. 20, 2019

(65) Prior Publication Data

US 2020/0300177 A1    Sep. 24, 2020

(51) Int. Cl.
| | |
|---|---|
| *F02C 9/18* | (2006.01) |
| *F01D 11/24* | (2006.01) |
| *F01D 19/00* | (2006.01) |
| *F01D 17/20* | (2006.01) |
| *F01D 11/22* | (2006.01) |
| *F01D 11/12* | (2006.01) |

(52) U.S. Cl.
CPC .............. *F02C 9/18* (2013.01); *F01D 11/24* (2013.01); *F01D 17/20* (2013.01); *F01D 19/00* (2013.01); *F01D 11/122* (2013.01); *F01D 11/22* (2013.01)

(58) Field of Classification Search
None
See application file for complete search history.

(56) References Cited

U.S. PATENT DOCUMENTS

| | | | | |
|---|---|---|---|---|
| 2,837,270 | A | * 6/1958 | Chapman | F04D 29/522 415/17 |
| 4,069,662 | A |   1/1978 | Redinger, Jr. et al. | |
| 4,329,114 | A | * 5/1982 | Johnston | F01D 11/24 415/116 |
| 4,338,061 | A | * 7/1982 | Beitler | F01D 11/24 415/1 |
| 5,351,478 | A | * 10/1994 | Walker | F01D 25/26 415/144 |

(Continued)

FOREIGN PATENT DOCUMENTS

| | | |
|---|---|---|
| EP | 3216987 A1 | 3/2017 |
| WO | 2016064389 A1 | 4/2016 |

OTHER PUBLICATIONS

Extended European Search Report dated Jun. 30, 2020, received for corresponding European Application No. 20162219.8, 9 pages.

*Primary Examiner* — Michael Lebentritt
*Assistant Examiner* — Jason G Davis
(74) *Attorney, Agent, or Firm* — Kinney & Lange, P.A.

(57) ABSTRACT

A compressor case for a gas turbine engine includes an annular body that extends circumferentially around a center axis and extends axially along the center axis. A first bleed manifold is formed on an outer surface of the annular body and encloses a first plenum. A second bleed manifold is formed on the outer surface of the annular body and is axially aft of the first bleed manifold. The second bleed manifold encloses a second plenum. A bleed inlet extends through the annular body and into the first bleed manifold. Cooling passages are formed in the annular body, and each of the cooling passages extends from the first plenum to the second plenum and fluidically connects the first plenum to the second plenum.

18 Claims, 6 Drawing Sheets

(56) References Cited

U.S. PATENT DOCUMENTS

| | | | |
|---|---|---|---|
| 5,351,732 A * | 10/1994 | Mills | F01D 11/24 |
| | | | 415/115 |
| 6,227,800 B1 * | 5/2001 | Spring | F01D 11/24 |
| | | | 415/116 |
| 7,434,402 B2 | 10/2008 | Paprotna et al. | |
| 10,393,149 B2 * | 8/2019 | Mondal | F01D 11/24 |
| 10,669,878 B2 * | 6/2020 | Liu | F01D 11/122 |

* cited by examiner

MISSION ADAPTIVE CLEARANCE CONTROL SYSTEM AND METHOD OF OPERATION

BACKGROUND

The present disclosure relates to gas turbine engines, and in particular, to reducing tip clearances between rotating blades and a surround static case or static seal.

Gas turbine engines have internal flowpaths that include rows (or stages) of rotating blades surrounded by static cases, such as in the compressor section, which generally includes a low pressure compressor and a high pressure compressor. The high pressure compressor typically includes several axially-spaced stages of rotating blades that progressively decrease in size toward a rear of the high pressure compressor.

The aerodynamic efficiency of the compressor section in a gas turbine engine is largely dependent upon the clearance between the tips of each stage of rotating blades and the surrounding case. As the tip clearance is increased, substantial amounts of working gases leak circumferentially over the tips of the blades from the pressure sides to the suction sides of the blades. Additionally, a portion of the working gases leaks axially over the tips from the downstream end to the upstream end of the airfoils.

Tip clearance at the rear of the high pressure compressor is of particular importance due to the increased pressure ratio at the rear of the high pressure compressor as well as the smaller airfoil sizes of the blades there which makes a given radial clearance a higher percentage of the overall airfoil radial span. Thus, engine efficiency can be improved by controlling and reducing tip clearance between the rotating blades and the static case, especially in the high pressure compressor. However, reducing the tip clearance between rotating blades and a static case is challenging as the tip clearance varies during different operating conditions of the gas turbine engine that causes the rotating blades and the static case to expand and contract relative one another.

SUMMARY

In one aspect of the disclosure, a compressor case for a gas turbine engine includes an annular body that extends circumferentially around a center axis and extends axially along the center axis. A first bleed manifold is formed on an outer surface of the annular body and encloses a first plenum. A second bleed manifold is formed on the outer surface of the annular body and is axially aft of the first bleed manifold. The second bleed manifold encloses a second plenum. A bleed inlet extends through the annular body and into the first bleed manifold. Cooling passages are formed in the annular body, and each of the cooling passages extends from the first plenum to the second plenum and fluidically connects the first plenum to the second plenum. A first outlet is formed in the first bleed manifold, and a second outlet is formed in the second bleed manifold. A first valve is connected to the first outlet, and a second valve is connected to the second outlet. A control is configured to actuate the first and second valves.

In another aspect of the disclosure, a compressor section for a gas turbine engine includes at least one stage of rotor blades extending circumferentially around a center axis and a compressor case. The compressor case includes an annular body that extends circumferentially around the at least one stage of rotor blades and extends axially along the center axis. A first bleed manifold is formed on an outer surface of the annular body axially forward of the at least one stage of rotor blades and encloses a first plenum. A second bleed manifold is formed on the outer surface of the annular body and is axially aft of the first bleed manifold. The second bleed manifold encloses a second plenum. A bleed inlet extends through the annular body and into the first bleed manifold. Cooling passages are formed in the annular body, and each of the cooling passages extends from the first plenum to the second plenum and fluidically connects the first plenum to the second plenum.

In another aspect of the disclosure, a method for adjusting a clearance between a tip of a rotor blade and a case disposed circumferentially around the rotor blade includes directing airflow into a first manifold on an outer surface of the case that is also axially forward of the rotor blade. In a first mode, the airflow is directed inside the first manifold into cooling passages formed in the case. Each of the cooling passages extends from the first manifold to a second manifold that is on the outer surface of the case aft of the first manifold. The airflow is directed inside the first manifold into the cooling passages formed in the case by closing a first valve connected to a first outlet formed on the first manifold and by opening a second valve connected to a second outlet formed on the second manifold. The case is cooled by flowing the airflow through the cooling passages and into the second manifold such that the case contracts in diameter around the rotor blade.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to a compressor case and clearance control system that allows for controlled thermal contraction and expansion of the compressor case to actively control tip clearances between the case and rotating blades housed within the case. The compressor case includes a first manifold formed on an outer surface of the compressor case and a second manifold formed on the outer surface of the compressor case aft and downstream from the first manifold. Cooling passages are formed in the case and extend between the first manifold and the second manifold. A bleed inlet extends through the case and allows airflow to enter the first manifold, the cooling passages, and the second manifold when a valve on an outlet of the second manifold is opened. The airflow in the cooling passages cools the compressor case and causes the compressor to contract in diameter. Closing the valve on the outlet of the second manifold stops the airflow through the cooling passages and allows the case to heat and expand in diameter. The compressor case and clearance control system are discussed below with reference to the figures.

Figure 1:
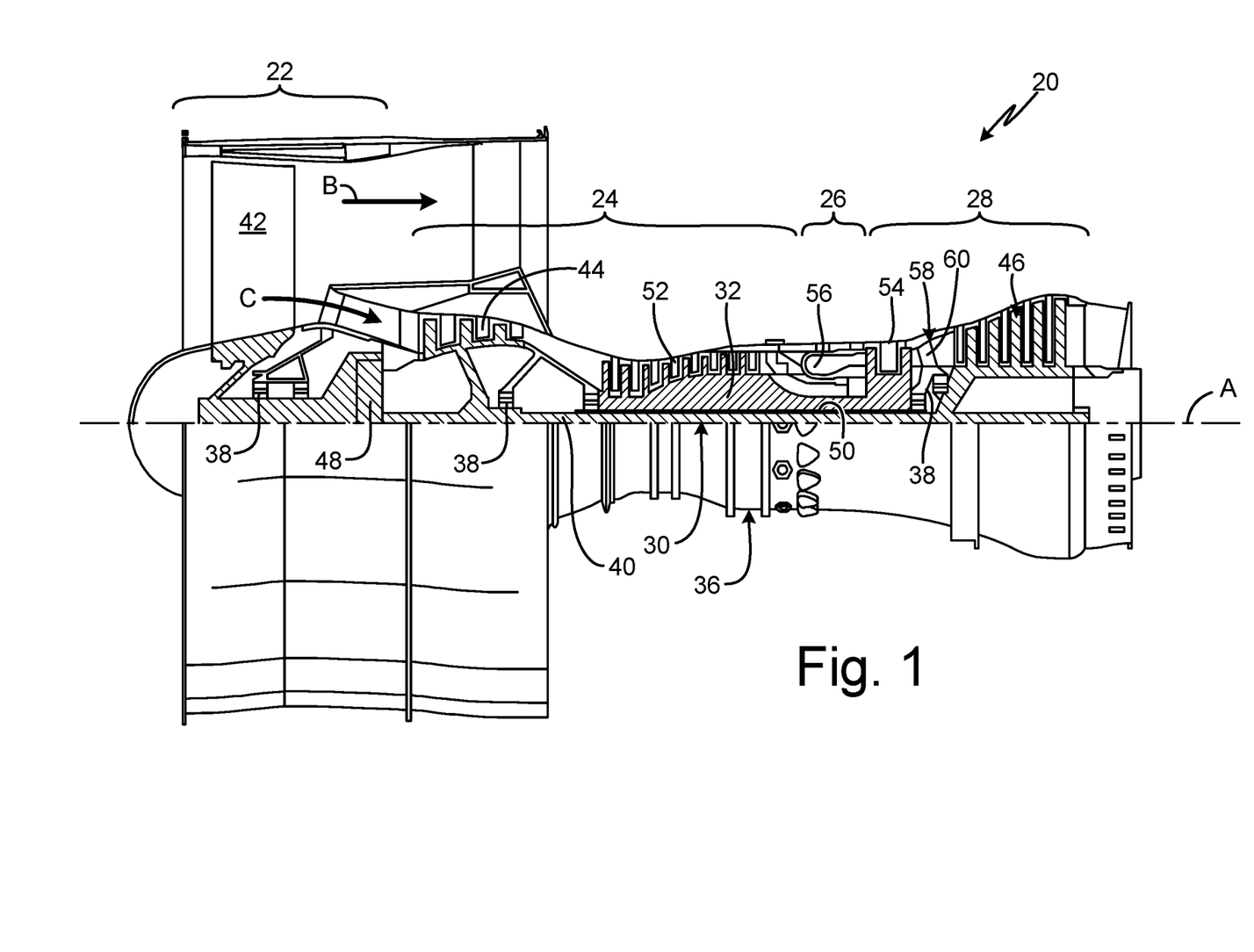
FIG. 1 is a partial cross-sectional view of a gas turbine engine.

FIG. 1 is a quarter-sectional view that schematically illustrates example gas turbine engine 20 that includes fan section 22, compressor section 24, combustor section 26 and turbine section 28. Alternative engines might include an augmenter section (not shown) among other systems or features. Fan section 22 drives air along bypass flowpath B while compressor section 24 draws air in along core flowpath C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis A.

Combustor 56 is arranged between high pressure compressor 52 and high pressure turbine 54. In one example, high pressure turbine 54 includes at least two stages to provide double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 can be arranged generally between high pressure turbine 54 and low pressure turbine 46. Mid-turbine frame 58 further supports bearing systems 38 in turbine section 28 as well as setting airflow entering the low pressure turbine 46.

The gas flow in core flowpath C is compressed first by low pressure compressor 44 and then by high pressure compressor 52, then mixed with fuel and ignited in combustor 56 to produce high speed exhaust gases that are then expanded through high pressure turbine 54 and low pressure turbine 46. Mid-turbine frame 58 includes vanes 60, which are in the core flowpath and function as an inlet guide vane for low pressure turbine 46.

Figure 2:
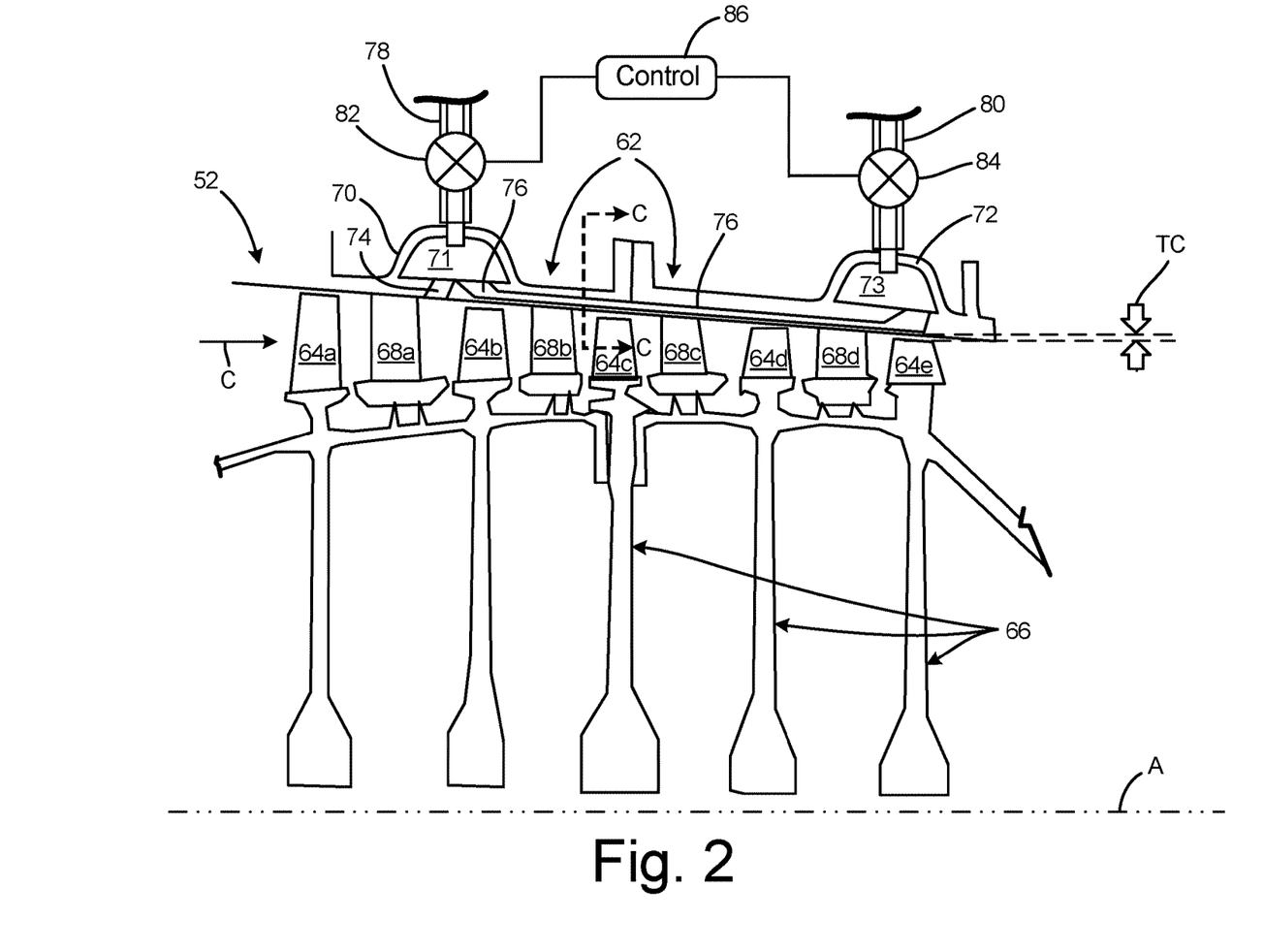
FIG. 2 is a cross-sectional view of a high pressure compressor of the gas turbine engine from FIG. 1 with a clearance control system.
Figure 3:
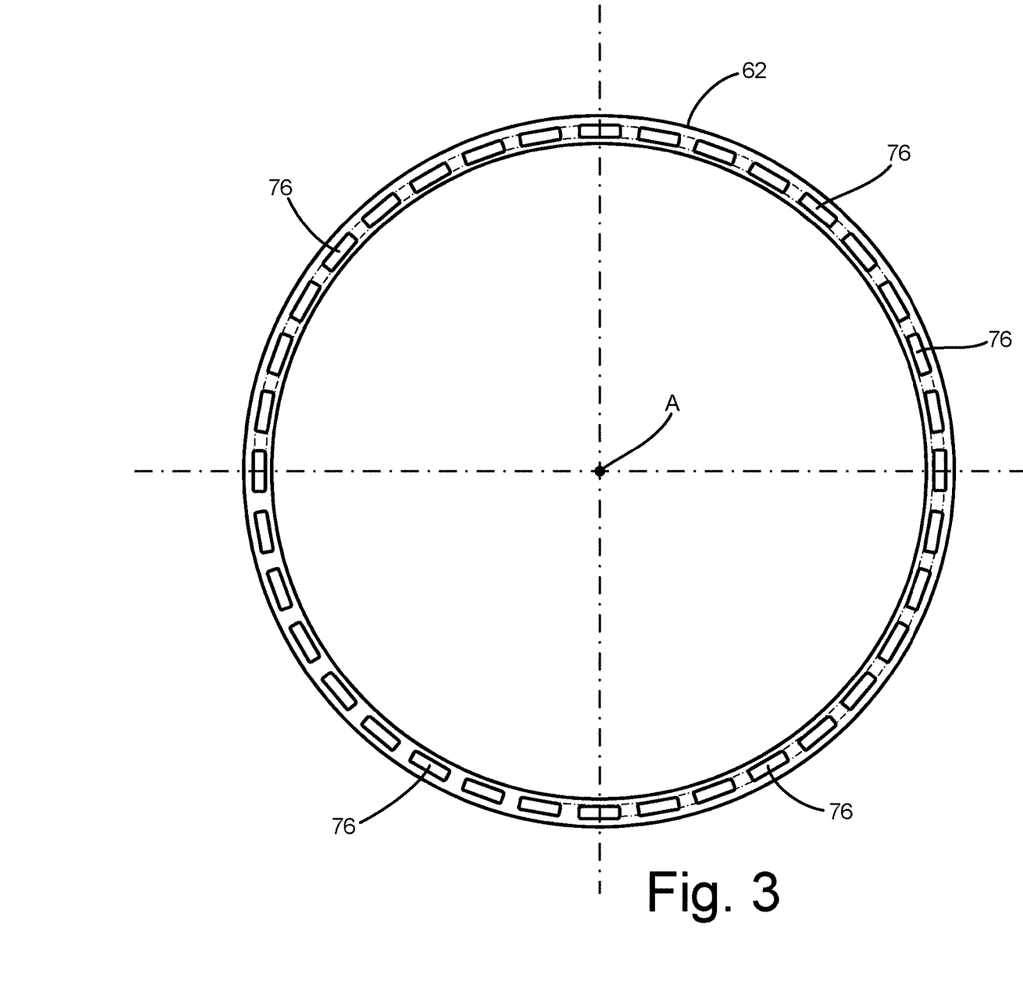
FIG. 3 is a cross-sectional view of a compressor case from the high pressure compressor of FIG. 2 taken along line C-C.

FIGS. 2 and 3 will be discussed concurrently. FIG. 2 is a cross-sectional schematic view of high pressure compressor 52 with compressor case 62. FIG. 3 is a cross-sectional view of compressor case 62 of high pressure compressor 52 taken along line C-C from FIG. 2. As shown in FIG. 2, high pressure compressor 52 also includes rotor blade stages 64a-64e, rotor disks 66, and stator stages 68a-68d. Compressor case 62 includes a clearance control system that includes first bleed manifold 70, first plenum 71, second bleed manifold 72, second plenum 73, bleed inlet 74, cooling passages 76, first outlet 78, second outlet 80, first valve 82, second valve 84, and control 86. The clearance control system of compressor case 62 is used to control tip clearances TC between compressor case 62 and one or more rotor stage blades 64a-e including at least rotor blade stage 64e.

Compressor case 62 includes an annular body that extends circumferentially around center axis A and extends axially along center axis A. As shown if FIG. 2, compressor case 62 can be a divided into two or more parts to allow easier assembly of high pressure compressor 52. In this scenario, the cooling passages 76 would be aligned to allow for continuous flow between individual compressor case sections 62. Rotor blade stages 64a-64e are assembled within compressor case 62 and are arranged axially in order inside compressor case 62 such that rotor blade stage 64a is located at a forward or upstream end of high pressure compressor 52 and rotor blade stage 64e is located at a rear or downstream end of high pressure compressor 52. Each of rotor blade stages 64a-64e includes a plurality of rotor blades supported by one of rotor disks 66. Stator stages 68a-68d are arranged axially inside compressor case 62 in alternating order with rotor blade stages 64a-64e respectively. Rotor blade stages 64a-64e and rotor disks 66 are configured to rotate about center axis A and compress core airflow C as core airflow C progresses from rotor blade stage 64a to rotor blade stage 64e. In the embodiment shown, rotor blades 64a-64e are machined as part of rotor disks 66 or otherwise bonded to the disks 66 to form an integrally bladed rotor. In other embodiments, one or more of rotor blade stages 64a-64e may utilize one or more mechanically attached blades attached to rotor disk 66. Stator stages 68a-68d each contain a plurality of stator vanes that de-swirl and guide core airflow C as core airflow C progresses through high pressure compressor 52.

First bleed manifold 70 is formed on an outer surface of the annular body of compressor case 62. First bleed manifold 70 forms and encloses first plenum 71. Both first bleed manifold 70 and first plenum 71 can extend completely or partially around a circumference of the annular body of compressor case 62. First bleed manifold 70 is positioned axially on compressor case 62 toward an upstream end of high pressure compressor 52 and forward of second bleed manifold 72. For example, in the embodiment of FIG. 2, first bleed manifold 70 is positioned axially over stator stage 68a and rotor blade stage 64b. In other embodiments, first bleed manifold 70 can be positioned axially upstream of rotor blade stage 64a.

Second bleed manifold 72 is also formed on the outer surface of the annular body of compressor case 62. Second bleed manifold 72 forms and encloses second plenum 73. Similar to first bleed manifold 70 and first plenum 71, second bleed manifold 72 and second plenum 73 can extend completely or partially around a circumference of the annular body of compressor case 62. Second bleed manifold 72 is positioned on compressor case 62 axially aft of first bleed manifold 70 and toward a rear end of high pressure compressor 52. In the embodiment of FIG. 2, second bleed manifold 72 is positioned axially over stator stage 68d and rotor blade stage 64e, rotor blade stage 64e being the last stage of high pressure compressor 52. In alternative embodiments, second bleed manifold 72 can be positioned axially forward of the last rotor stage of high pressure compressor 52.

Bleed inlet 74 is formed in compressor case 62 and extends through the annular body of compressor case 62 and into first plenum 71 and first bleed manifold 70. Bleed inlet 74 fluidically connects first plenum 71 with the core flowpath of high pressure compressor 52. As shown in the embodiment of FIG. 2, bleed inlet 74 can be formed compressor case 62 between stator stage 68a and rotor blade stage 64b. Cooling passages 76 (only one of which is shown in FIG. 2) are formed in the annular body of compressor case 62, and each of the cooling passages 76 extends axially through the annular body of compressor case 62 from first plenum 71 to second plenum 73. Cooling passages 76 fluidically connect first plenum 71 to second plenum 73.

As shown in FIG. 3, cooling passages 76 are circumferentially spaced from one another about center axis A. In the embodiment of FIG. 3, thirty-six cooling passages 76 are formed in compressor case 62 and are evenly distributed from one another about center axis A. The even distribution of cooling passages 76 in compressor case 62 helps to evenly cool compressor case 62 when cooling air flows through cooling passages 76 from first plenum 71 to second plenum 73 thereby preventing or greatly minimizing thermally induced asymmetry (i.e case out of roundness about axis A). While the embodiment of FIG. 3 shows thirty-six cooling passages 76, other embodiments can include a greater number or a smaller number of cooling passages 76. In other embodiments including situations where compressor case 62 comprises machined halves to enable assembly of compressor 52, the spacing of cooling passages may be generally uniform but not totally evenly distributed. Cooling passages 76, as embodied in FIGS. 2 and 3, are integral with compressor case 62 and can be formed in compressor case 62 by way of additive manufacturing, casting, electro-discharge machining, or by way of conventional machining and the use of a cover bonded via welding or brazing. Cooling fins, cooling strips, or cooling pedestals (none of which are shown) can be formed cooling passages 76 to increase the internal surface area of each of cooling passages 76 and augment the convective heat transfer capability of each of cooling passages 76.

First outlet 78, shown in FIG. 2, is formed in first bleed manifold 70 and fluidically connects first plenum 71 to a low pressure sink utilizing this bleed flow (not shown). The sink of this bleed flow can be atmosphere, an aircraft environmental control system, turbine section 28 (shown in FIG. 1), or any engine system or subsystem that has a lower pressure than high pressure compressor 52 at bleed inlet 74. In some cases the subsystem may contain a compressor that subsequently raises the pressure of the bleed flow. First valve 82 is connected to first outlet 78 and is configured to fluidically open and close first outlet 78. Second outlet 80 is formed in second bleed manifold 72 and fluidically connects first plenum 71 to the same low pressure sink as first outlet 78, or another sink that also has a lower pressure than high pressure compressor 52 at bleed inlet 74. In some cases the subsystem may contain a compressor that subsequently raises the pressure of the bleed flow. Second valve 84 is connected to second outlet 80 and is configured to fluidically open and close second outlet 80. Control 86 is connected to first valve 82 and second valve 84 and is configured to actuate first valve 82 and second valve 84. As discussed below with reference to FIGS. 4a and 4b, control 86 selectively actuates first valve 82 and second valve 84 to direct cooling air into first plenum 71, through cooling passages 76, and through second plenum 73 to cool compressor case 62 and thereby control the tip clearances TC between compressor case 62 and at least rotor blade stage 64e.

Figure 4A:
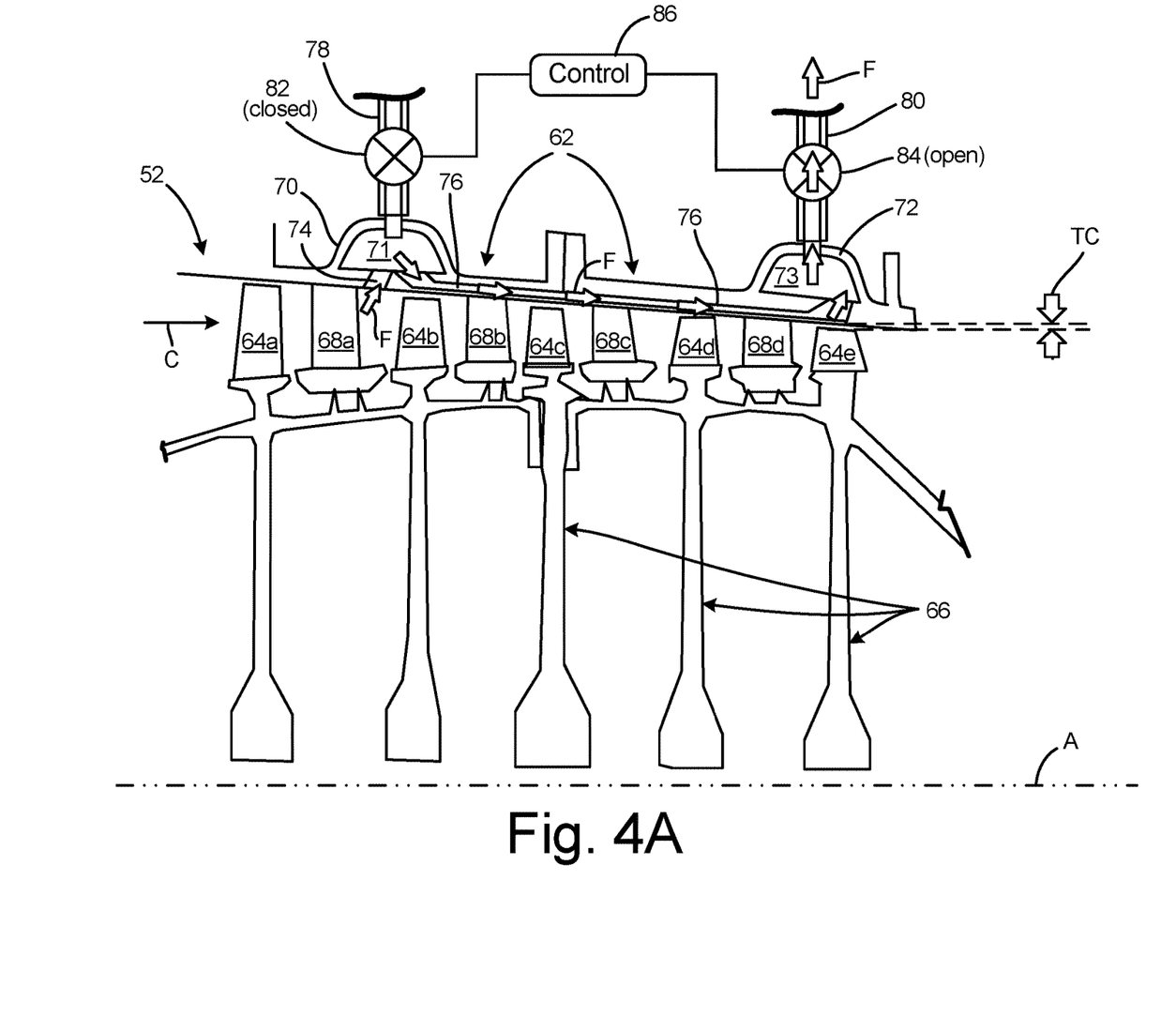
FIG. 4a is another cross-sectional view of the high pressure compressor from FIG. 2 with the clearance control system in a first mode.
Figure 4B:
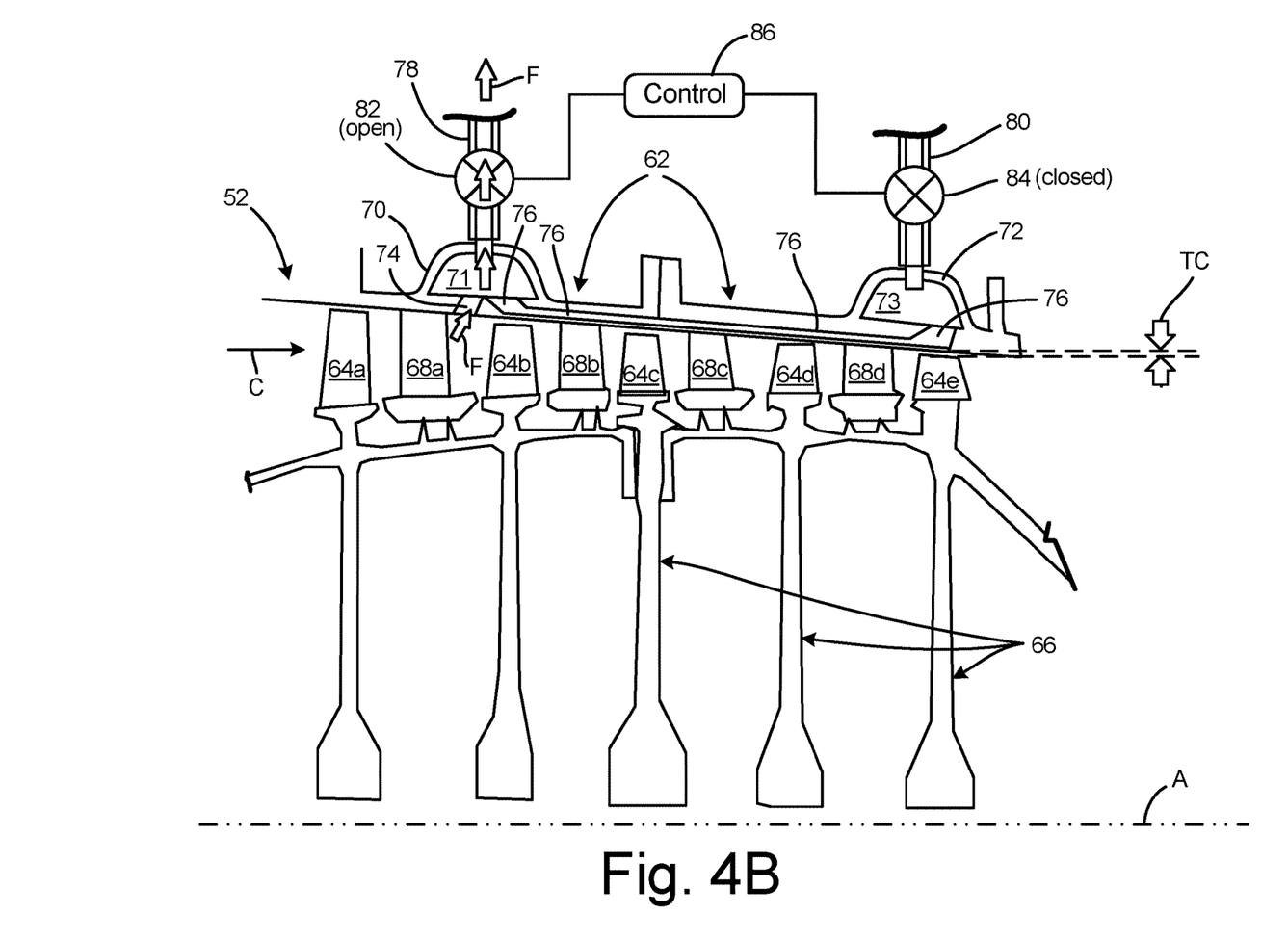
FIG. 4b is another cross-sectional view of the high pressure compressor from FIG. 2 with the clearance control system in a second mode.

FIGS. 4a and 4b will be discussed concurrently. FIG. 4a is another cross-sectional schematic view of high pressure compressor 52 from FIG. 2 with the clearance control system in a first mode. FIG. 4b is another cross-sectional schematic view of high pressure compressor 52 from FIG. 2, with the clearance control system in a second mode. While in the first mode, as shown in FIG. 4a, second valve 84 is actuated by control 86 to open second outlet 80, while first valve 82 is actuated by control 86 to close first outlet 78. With first outlet 78 and first valve 82 closed and second outlet 80 and second valve 84 opened, the pressure inside second plenum 73, cooling passages 76, first plenum 71, and bleed inlet 74 drops, thereby causing the higher pressure inside high pressure compressor 52 to push and direct cooling airflow F into bleed inlet 74 and into first plenum 71 inside first bleed manifold 70. After entering first plenum 71, the cooling airflow F is directed into cooling passages 76, flows through cooling passages 76, enters second plenum 71, and exits second bleed manifold 72 through second outlet 80 and second valve 84.

As flow is compressed in compressor 52, the temperature of the compressed air also increases. As such, the flowpath temperature of the flow increases as the flow travels aft from compressor blade 64a and compressor stator 68a to stator 68d and compressor blade 64e. The heat from the increasing gaspath temperature resulting from the increasingly pressurized flow is transferred to adjacent components including compressor case 62. As the cooling airflow F taken from a forward portion of the compressor 52 with lower pressure and temperature than the rear of the compressor, it flows through cooling passages 76 and the cooling airflow F absorbs heat from compressor case 62 and thereby cools compressor case 62. As compressor case 62 cools, compressor case 62 contracts in diameter around rotor blade stages 64c-64e, thereby reducing the tip clearances TC between rotor blade stages 64c-64e and compressor case 62. This first mode of the clearance control system on compressor case 62 can be implemented by control 86 when gas turbine engine 20 (shown in FIG. 1) is operating at cruise. Control 86 can be preprogramed to anticipate when cruise will happen, or a human operator can give a command to control 86 in real time prior to entering cruise. During an operation cycle, gas turbine engine 20 spends most of the operation cycle at cruise. Reducing tip clearances TC during cruise improves performance efficiency of gas turbine engine 20, which in turn reduces fuel consumption and for reduced cost or enhanced aircraft range. During cruise, the blades in rotor blade stages 64a-64e rotate at a generally constant speed and thus do not have time dependent radial growth variation as during other engine operating conditions. Thus, reducing tip clearances TC during cruise can be done with relatively little risk that rotor blade stages 64c-64e will contact and abrade with compressor case 62. Abradable seals (not shown) can be connected to an inner surface of compressor case 62 and circumferentially around rotor blade stages 64c-64e as a secondary measure should rotor blade stages 64c-64e expand more than expected and contact compressor case 62. Rotor blade stage 6a-64e interaction with case 62 in locations with abradable seals can have a permanent adverse impact on tip clearance TC and overall engine performance due to physical material removal and subsequent change in the geometry of one or more components. As such, it is desired to have tip clearance TC be as small as possible without any physical interaction at abradable locations.

The second mode of the clearance control system of compressor case 62, as shown in FIG. 4b, is primarily used when gas turbine engine 20 is accelerating (such as at takeoff of an aircraft) or experiencing transient conditions (such as during an aircraft landing or maneuver at 2 g or beyond). In the second mode, compressor case 62 is allowed to expand to increase the tip clearances TC between compressor case 62 and rotor blade stages 64c-64e, thereby preventing rotor blade stages 64c-64e from contacting and abrading with compressor case 62 while rotor blade stages 64c-64e thermally expand during acceleration. Control 86 enacts the second mode by opening first valve 82 and closing second valve 84. With second valve 84 closed, second outlet 80 is closed, which stops cooling airflow F from flowing through cooling passages 76. Instead, cooling airflow F is directed out of first bleed manifold 70 via first outlet 78 and first valve 82. With cooling airflow F stopped in cooling passages 76, the temperature of compressor case 62 increases and causes compressor case 62 to expand in diameter.

Figure 5:
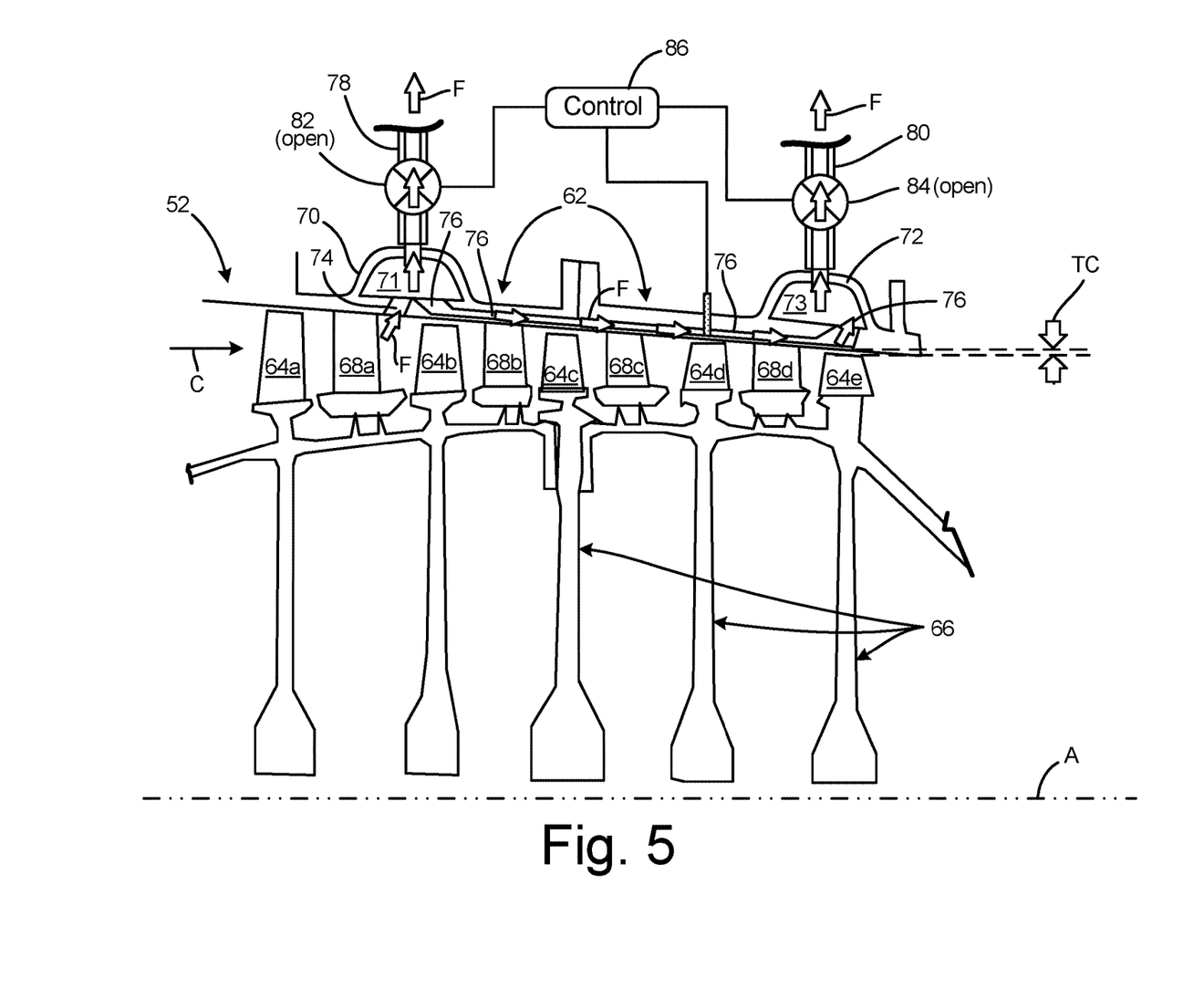
FIG. 5 is a cross-sectional view of another embodiment of the high pressure compressor of the gas turbine engine from FIG. 1 with a clearance control system.

FIG. 5 is a cross-sectional schematic view of another embodiment of high pressure compressor 52 with that includes clearance measure sensor 88 on compressor case 62. Clearance measure sensor 88 extends through the annular body of compressor case 62 over at least one of rotor blade stages 64c-64d. In the embodiment of FIG. 5, clearance measure sensor 88 is positioned over rotor blade stage 64d. Clearance measure sensor 88 is configured to measure a distance between the inner surface of compressor case 62 and tips of each rotor blade in rotor blade stage 64d. Clearance measure sensor 88 is connected to control 86 and is configured to communicate with control 86 in a closed feedback loop. Instead of actuating first valve 82 and second valve 84 between binary first and second modes, control 86 can actively modulate first valve 82 and second valve 84 based on feedback from clearance measure sensor 88 to more precisely control the tip clearances TC during all engine operating conditions.

The following are non-exclusive descriptions of possible embodiments of the present invention.

In one embodiment, a compressor case for a gas turbine engine includes an annular body that extends circumferentially around a center axis and extends axially along the center axis. A first bleed manifold is formed on an outer surface of the annular body and encloses a first plenum. A second bleed manifold is formed on the outer surface of the annular body and is axially aft of the first bleed manifold. The second bleed manifold encloses a second plenum. A bleed inlet extends through the annular body and into the first bleed manifold. Cooling passages are formed in the annular body, and each of the cooling passages extends from the first plenum to the second plenum and fluidically connects the first plenum to the second plenum. A first outlet is formed in the first bleed manifold, and a second outlet is formed in the second bleed manifold. A first valve is connected to the first outlet, and a second valve is connected to the second outlet. A control is configured to actuate the first and second valves.

The compressor case of the preceding paragraph can optionally include, additionally and/or alternatively, any one or more of the following features, configurations and/or additional components:

the cooling passages are circumferentially spaced from one another about the center axis and each of the cooling holes extends axially from the first plenum to the second plenum;

cooling fins, cooling strips, or cooling pedestals are formed in at least one of the cooling passages;

the first bleed manifold extends around a circumference of the annular body, and wherein the second bleed manifold extends around the circumference of the annular body;

the cooling passages are integrally formed with the annular body; and/or a clearance measure sensor extending through the annular body of the compressor case, wherein the clearance measure sensor is configured to measure a distance between an inner surface of the annular body and a tip of a rotor blade positioned within the case.

In another embodiment, a compressor section for a gas turbine engine includes at least one stage of rotor blades extending circumferentially around a center axis and a compressor case. The compressor case includes an annular body that extends circumferentially around the at least one stage of rotor blades and extends axially along the center axis. A first bleed manifold is formed on an outer surface of the annular body axially forward of the at least one stage of rotor blades and encloses a first plenum. A second bleed manifold is formed on the outer surface of the annular body and is axially aft of the first bleed manifold. The second bleed manifold encloses a second plenum. A bleed inlet extends through the annular body and into the first bleed manifold. Cooling passages are formed in the annular body, and each of the cooling passages extends from the first plenum to the second plenum and fluidically connects the first plenum to the second plenum.

The compressor section of the preceding paragraph can optionally include, additionally and/or alternatively, any one or more of the following features, configurations and/or additional components:

a first outlet formed in the first bleed manifold; and a second outlet formed in the second bleed manifold;

a first valve connected to the first outlet; a second valve connected to the second outlet; and a control configured to actuate the first and second valves;

a clearance measure sensor extending through the annular body of the compressor case, wherein the clearance measure sensor is configured to measure a distance between an inner surface of the annular body and a tip of each rotor blade of the at least one stage of rotor blades, and wherein the clearance measure sensor is connected to the control and configured to communicate with the control;

the compressor section is a high pressure compressor for the gas turbine engine and the at least one stage of rotor blades is a rear stage of rotor blades for the high pressure compressor;

the cooling passages are circumferentially spaced from one another about the center axis and each of the cooling holes extends axially from the first plenum to the second plenum;

cooling fins, cooling strips, or cooling pedestals are formed in at least one of the cooling passages;

the first bleed manifold extends around a circumference of the annular body, and wherein the second bleed manifold extends around the circumference of the annular body; and/or an abradable seal is connected to an inner surface of the case and extends circumferentially around the at least one stage of rotor blades.

In another embodiment, a method for adjusting a clearance between a tip of a rotor blade and a case disposed circumferentially around the rotor blade includes directing airflow into a first manifold on an outer surface of the case that is also axially forward of the rotor blade. In a first mode, the airflow is directed inside the first manifold into cooling passages formed in the case. Each of the cooling passages extends from the first manifold to a second manifold that is on the outer surface of the case aft of the first manifold. The airflow is directed inside the first manifold into the cooling passages formed in the case by closing a first valve connected to a first outlet formed on the first manifold and by opening a second valve connected to a second outlet formed on the second manifold. The case is cooled by flowing the airflow through the cooling passages and into the second manifold such that the case contracts in diameter around the rotor blade.

The method of the preceding paragraph can optionally include, additionally and/or alternatively, any one or more of the following features, configurations and/or additional components:

in a second mode, directing the airflow inside the first manifold away from the cooling passages by opening the first valve and closing the second valve such that the case expands in diameter around the rotor blade;

the second mode occurs when the rotor blade is accelerating, or decelerating, and wherein the first mode occurs when the rotor blade is rotating approximately at a constant speed;

the gas turbine engine is connected to an aircraft, and wherein the second mode occurs when the rotor blade is accelerating, decelerating, and/or when the aircraft is maneuvering at 2 g or beyond; and/or the airflow is directed into the first manifold from a core airflow in a compressor upstream of the rotor blade.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A compressor case for a gas turbine engine comprising:
    an annular body that extends circumferentially around a center axis and extends axially along the center axis, wherein the annular body comprises an inner surface and an outer surface;
    a first bleed manifold formed on the outer surface of the annular body, wherein the first bleed manifold encloses a first plenum;
    a second bleed manifold formed on the outer surface of the annular body and is axially aft of the first bleed manifold, wherein the second bleed manifold encloses a second plenum;
    a bleed inlet extending through the annular body and into the first bleed manifold;
    cooling passages formed in the annular body, wherein the cooling passages are radially between the inner surface and the outer surface of the annular body, and wherein each of the cooling passages extends from the first plenum to the second plenum and fluidically connects the first plenum to the second plenum;
    a first outlet formed in the first bleed manifold;
    a second outlet formed in the second bleed manifold;
    a first valve connected to the first outlet;
    a second valve connected to the second outlet; and
    a control configured to actuate the first and second valves.

2. The compressor case of claim 1, wherein the cooling passages are circumferentially spaced from one another about the center axis and each of the cooling passages extends axially from the first plenum to the second plenum.

3. The compressor case of claim 1, wherein the first bleed manifold extends around a circumference of the annular body, and wherein the second bleed manifold extends around the circumference of the annular body.

4. The compressor case of claim 1, wherein the cooling passages are integrally formed with the annular body.

5. The compressor case of claim 1, further comprising:
    a clearance measure sensor extending through the annular body of the compressor case, wherein the clearance measure sensor is configured to measure a distance between an inner surface of the annular body and a tip of a rotor blade positioned within the case.

6. A compressor section for a gas turbine engine comprising:
    at least one stage of rotor blades extending circumferentially around a center axis;
    a compressor case comprising:
        an annular body that extends circumferentially around the at least one stage of rotor blades and extends axially along the center axis, wherein the annular body comprises an inner surface and an outer surface;

a first bleed manifold formed on the outer surface of the annular body axially forward of the at least one stage of rotor blades, wherein the first bleed manifold encloses a first plenum;

a second bleed manifold formed on the outer surface of the annular body and is axially aft of the first bleed manifold, wherein the second bleed manifold encloses a second plenum;

a bleed inlet extending through the annular body and into the first bleed manifold; and cooling passages formed in the annular body, wherein the cooling passages are radially between the inner surface and the outer surface of the annular body, and wherein each of the cooling passages extends from the first plenum to the second plenum and fluidically connects the first plenum to the second plenum.

7. The compressor section of claim 6, further comprising:
a first outlet formed in the first bleed manifold; and
a second outlet formed in the second bleed manifold.

8. The compressor section of claim 7, further comprising:
a first valve connected to the first outlet;
a second valve connected to the second outlet; and
a control configured to actuate the first and second valves.

9. The compressor section of claim 8, further comprising:
a clearance measure sensor extending through the annular body of the compressor case, wherein the clearance measure sensor is configured to measure a distance between an inner surface of the annular body and a tip of each rotor blade of the at least one stage of rotor blades, and wherein the clearance measure sensor is connected to the control and configured to communicate with the control.

10. The compressor section of claim 6, wherein the compressor section is a high pressure compressor for the gas turbine engine and the at least one stage of rotor blades is a rear stage of rotor blades for the high pressure compressor.

11. The compressor section of claim 6, wherein the cooling passages are circumferentially spaced from one another about the center axis and each of the cooling passages extends axially from the first plenum to the second plenum.

12. The compressor section of claim 6, wherein the first bleed manifold extends around a circumference of the annular body, and wherein the second bleed manifold extends around the circumference of the annular body.

13. The compressor section of claim 6, wherein an abradable seal is connected to an inner surface of the case and extends circumferentially around the at least one stage of rotor blades.

14. A method for adjusting a clearance between a tip of a rotor blade and a case disposed circumferentially around the rotor blade comprises:

directing airflow into a first manifold on an outer surface of the case, wherein the first manifold is axially forward of the rotor blade;

in a first mode, directing the airflow inside the first manifold into cooling passages formed in the case, wherein each of the cooling passages is radially between the outer surface of the case and an inner surface of the case, and wherein each of the cooling passages extends from the first manifold to a second manifold that is on the outer surface of the case aft of the first manifold, by closing a first valve connected to a first outlet formed on the first manifold and by opening a second valve connected to a second outlet formed on the second manifold; and cooling the case by flowing the airflow through the cooling passages and into the second manifold such that the case contracts in diameter around the rotor blade.

15. The method of claim 14, further comprising:
in a second mode, directing the airflow inside the first manifold away from the cooling passages by opening the first valve and closing the second valve such that the case expands in diameter around the rotor blade.

16. The method of claim 15, wherein the second mode occurs when the rotor blade is accelerating, or decelerating, and wherein the first mode occurs when the rotor blade is rotating approximately at a constant speed.

17. The method of claim 16, wherein the airflow is directed into the first manifold from a core airflow in a compressor upstream of the rotor blade.

18. The method of claim 15, wherein the gas turbine engine is connected to an aircraft, and wherein the second mode occurs when the rotor blade is accelerating, decelerating, and/or when the aircraft is maneuvering at 2 g or beyond.

* * * * *